United States Patent
Makino et al.

(10) Patent No.: US 9,118,237 B2
(45) Date of Patent: Aug. 25, 2015

(54) MOVER FOR A LINEAR MOTOR AND LINEAR MOTOR

(75) Inventors: Shogo Makino, Fukuoka (JP); Toru Shikayama, Fukuoka (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 366 days.

(21) Appl. No.: 13/417,333

(22) Filed: Mar. 12, 2012

(65) Prior Publication Data

US 2013/0049489 A1 Feb. 28, 2013

(30) Foreign Application Priority Data

Aug. 23, 2011 (JP) .................................. 2011-181519

(51) Int. Cl.
 *H02K 41/03* (2006.01)
 *H02K 1/22* (2006.01)

(52) U.S. Cl.
 CPC .............. *H02K 41/033* (2013.01); *H02K 1/223* (2013.01)

(58) Field of Classification Search
 CPC ............................. H02K 41/033; H02K 1/223
 USPC .................................. 310/12.18, 12.24, 12.25
 See application file for complete search history.

(56) References Cited

U.S. PATENT DOCUMENTS

| | | | | |
|---|---|---|---|---|
| 4,563,602 A * | 1/1986 | Nagasaka | ................. | 310/12.22 |
| 4,638,192 A * | 1/1987 | von der Heide | ............ | 310/12.25 |
| 4,705,971 A * | 11/1987 | Nagasaka | ................. | 310/12.01 |
| 6,087,742 A * | 7/2000 | Maestre | ....................... | 310/12.24 |
| 6,194,796 B1 * | 2/2001 | Yeakley | ............................ | 310/14 |
| 6,573,623 B2 * | 6/2003 | Tsuboi et al. | ............... | 310/12.19 |
| 6,930,432 B2 * | 8/2005 | Maeda et al. | .................. | 310/263 |
| 6,960,858 B2 * | 11/2005 | Kawai | ........................... | 310/181 |
| 7,859,142 B2 * | 12/2010 | Armeit et al. | ............... | 310/12.24 |
| 8,022,587 B2 * | 9/2011 | Hoppe | .......................... | 310/181 |
| 2004/0174089 A1 * | 9/2004 | Maeda et al. | .................. | 310/263 |
| 2005/0082934 A1 | 4/2005 | Kawai | | |
| 2009/0072634 A1 * | 3/2009 | Vollmer | .......................... | 310/12 |
| 2009/0134626 A1 * | 5/2009 | Hoppe et al. | .................... | 290/55 |
| 2009/0206682 A1 * | 8/2009 | Jajtic | .......................... | 310/12.24 |
| 2009/0212644 A1 * | 8/2009 | Bott et al. | .................. | 310/12.14 |
| 2009/0322162 A1 * | 12/2009 | Jajtic et al. | ................. | 310/12.24 |

(Continued)

FOREIGN PATENT DOCUMENTS

| | | |
|---|---|---|
| CN | 101515731 | 8/2009 |
| JP | 60-200757 | 10/1985 |
| JP | 10-052024 | 2/1998 |

(Continued)

OTHER PUBLICATIONS

Japanese Office Action for corresponding JP Application No. 2011-181519, Jul. 16, 2013.

(Continued)

*Primary Examiner* — Alex W Mok
(74) *Attorney, Agent, or Firm* — Mori & Ward, LLP

(57) ABSTRACT

A mover for a linear motor includes an armature having a plurality of teeth arranged along a line and wound with coils. The mover further includes a main-pole magnet array arranged at a side of the armature at which the teeth exist. The main-pole magnet array includes a plurality of main-pole magnets with different polarities alternately arranged along an arranging direction of the teeth. The mover further includes at least one auxiliary-pole magnet arranged adjacent to one end or both ends of the main-pole magnet array.

16 Claims, 3 Drawing Sheets

(56) References Cited

U.S. PATENT DOCUMENTS

2010/0259112 A1* 10/2010 Chung et al. ............... 310/12.18
2010/0289365 A1* 11/2010 Bando et al. ............. 310/156.01

FOREIGN PATENT DOCUMENTS

| JP | 2001-095225 | 4/2001 |
| JP | 2006-262603 | 9/2006 |
| JP | 2008-125322 | 5/2008 |
| JP | 2009-219199 | 9/2009 |
| JP | 2010-124651 | 6/2010 |
| KR | 10-2010-0113290 | 10/2010 |

OTHER PUBLICATIONS

Chinese Office Action for corresponding CN Application No. 201210088812.7, Jul. 22, 2014.
Korean Office Action for corresponding KR Application No. 10-2012-0023934, Jul. 28, 2014.

* cited by examiner

US 9,118,237 B2

MOVER FOR A LINEAR MOTOR AND LINEAR MOTOR

CROSS-REFERENCE TO RELATED APPLICATIONS

The present application claims priority under 35 U.S.C. §119 to Japanese Patent Application No. 2011-181519 filed on Aug. 23, 2011. The contents of this application are incorporated herein by reference in their entirety.

BACKGROUND OF THE INVENTION

1. Field of the Invention

Embodiments disclosed herein relate to a mover for a linear motor and a linear motor provided with the mover.

2. Description of the Related Art

As one example of electric motors, there is conventionally known a linear motor in which a mover is moved along a stator. There are proposed linear motors in which permanent magnets are arranged at the side of a mover.

As an example, there is proposed a linear motor that includes: a mover having an armature with teeth wound with coils and a plurality of permanent magnets arranged in the armature; and a stator having salient poles formed on the surface thereof at a specified interval, the stator arranged in an opposing relationship with the mover (see, e.g., Japanese Patent Application Publication No. 2009-219199).

In the conventional linear motors in which permanent magnets are arranged at the side of a mover, however, cogging or thrust force ripple is generated when the mover is moved along a stator. The cogging or the thrust force ripple becomes a major culprit of thrust force variation and hinders smooth drive of a linear motor.

SUMMARY OF THE INVENTION

In view of the above, embodiments disclosed herein provide a mover for a linear motor capable of reducing thrust force variation and a linear motor provided with the mover.

In accordance with a first aspect of the present invention, there is provided a mover for a linear motor, including: an armature having a plurality of teeth arranged along a line and wound with coils; a main-pole magnet array arranged at a side of the armature at which the teeth exist, the main-pole magnet array including a plurality of main-pole magnets with different polarities alternately arranged along an arranging direction of the teeth; and at least one auxiliary-pole magnet arranged adjacent to one end or both ends of the main-pole magnet array.

According to embodiments disclosed herein, it is possible to provide a mover for a linear motor capable of reducing thrust force variation and a linear motor provided with the mover.

BRIEF DESCRIPTION OF THE DRAWINGS

The objects and features of the present invention will become apparent from the following description of embodiments, given in conjunction with the accompanying drawings, in which.

DESCRIPTION OF THE EMBODIMENTS

Embodiments of a mover for a linear motor and a linear motor provided with the mover will now be described in detail with reference to the accompanying drawings which form a part hereof. The present disclosure is not limited to the embodiments described herein below. For the sake of convenience in description, the positive side and the negative side along the X-axis in the respective drawings will be referred to as the "front side" and the "rear side" of a linear motor. The positive side and the negative side along the Y-axis in the respective drawings will be referred to as the "right side" and the "left side" of a linear motor. The positive side and the negative side along the Z-axis in the respective drawings will be referred to as the "upper side" and the "lower side" of a linear motor.

First Embodiment

Figure 1:
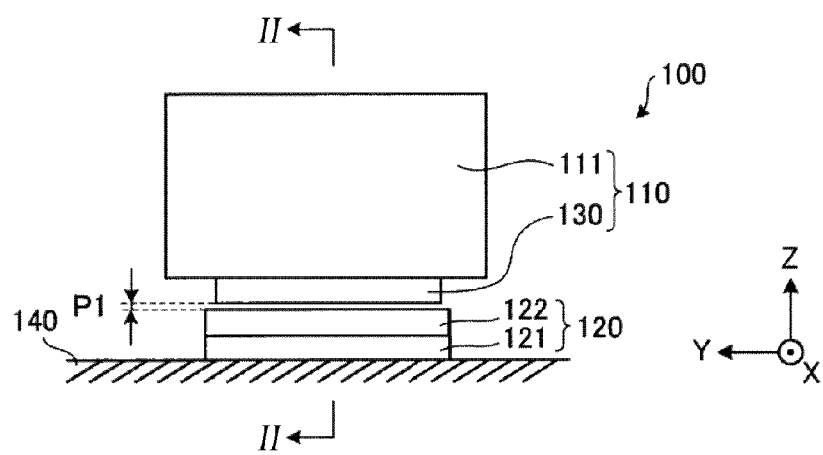
FIG. 1 is a schematic front view showing a linear motor according to a first embodiment of the present invention.
Figure 2:
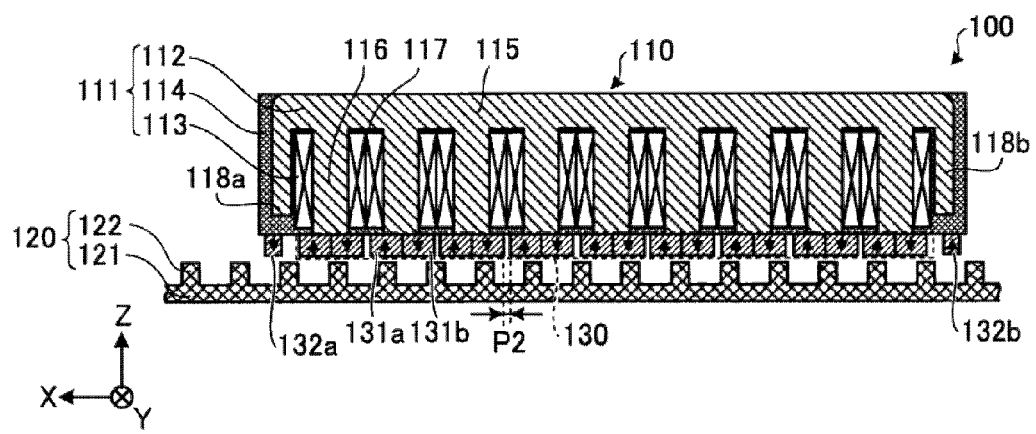
FIG. 2 is a schematic side section view of the linear motor taken along line II-II in FIG. 1.

First, description will be made on the configuration of a linear motor according to a first embodiment of the present invention. FIG. 1 is a schematic front view showing a linear motor according to the first embodiment. FIG. 2 is a schematic side section view of the linear motor according to the first embodiment, which is taken along line II-II in FIG. 1.

Referring to FIG. 1, the linear motor 100 according to the first embodiment includes a mover 110 and a stator 120, both of which extend in the front-rear direction (the X-axis direction in the present embodiment). The linear motor 100 is installed on an installation target 140. The mover 110 is opposed to the stator 120 with a gap P1 left therebetween in the up-down direction and is guided and supported by linear movement bearings (not shown) so that the mover 110 can move in the front-rear direction with respect to the stator 120.

In the linear motor 100, the mover 110 includes an armature 111 and a main-pole magnet array 130 and generates progressive magnetic fields. By virtue of the thrust force generated between the progressive magnetic fields and the salient poles 122 of the stator 120, the mover 110 is moved in the front-rear direction with respect to the stator 120. In the following description, the moving direction of the mover 110, i.e., the front-rear direction will be referred to as "stroke direction". While an auxiliary-pole magnet for reducing thrust force variation is not shown in FIG. 1, the auxiliary-pole magnet will be described later with reference to FIGS. 2 and 3.

As shown in FIG. 2, the mover 110 includes an armature core 112, a plurality of coils 113 and a main-pole magnet array 130. The armature core 112 includes a yoke portion 115, the longitudinal direction of which extends in the stroke direction, and a plurality of teeth 116 extending downward from the yoke portion 115. The teeth 116 are formed into a rectilinear shape extending in the left-right direction and are arranged at a specified interval along the stroke direction.

Spaces called "slots 117" are defined between the teeth 116. Coils 113 are received within the slots 117. More specifically, the coils 113 as three-phase armature windings are wound around the respective teeth 116 through insulation materials in the form of concentrated windings. Each of the coils 113 is formed of an insulating sheath wire, e.g., a copper wire.

The armature core 112 includes, e.g., nine teeth 116, which are divided into, e.g., first, second and third groups in the named order from the front side. Each of the groups includes three teeth 116 continuously arranged in the stroke direction. U-phase coils 113, V-phase coils 113 and W-phase coils 113 are respectively wound around the teeth 116 of the first, second and third groups in the form of concentrated windings.

Auxiliary teeth 118a and 118b protruding downward from the yoke portion 115 are formed at the stroke-direction opposite ends of the armature core 112 in an adjoining relationship with the teeth 116 arranged at the opposite ends. The auxiliary teeth 118a and 118b are formed to restrain the cogging which may become a major culprit of thrust force variation. The auxiliary teeth 118a and 118b are shorter in up-down length than the teeth 116 as main teeth and are not wound with coils. The armature core 112 is formed of a soft magnetic material, e.g., laminated silicon steel plates or a SMC (Soft Magnetic Composite) core. The SMC core is a core formed by compression-molding fine iron powder.

In a state that the coils 113 are wound around the respective teeth 116, the armature core 112 as a whole is molded with a molding resin 114. The molding resin 114 is filled in the slots 117 between the teeth 116 wound with the coils 113. The tip ends of the teeth 116 of the armature 111 are formed into a flat shape.

The main-pole magnet array 130 for generating a thrust force is fixed to the flat tip ends of the teeth 116 of the armature 111 by an adhesive agent or the like. Since the tip ends of the teeth 116 of the armature 111 are formed into a flat shape, it is possible to strongly bond the main-pole magnet array 130 to the teeth 116 and to arrange the main-pole magnet array 130 with increased accuracy.

The main-pole magnet array 130 includes main-pole magnets 131a and 131b differing in polarity from each other, which are alternately arranged along the arranging direction of the teeth 116. Each pair of the main-pole magnets 131a and 131b is arranged at the tip end of each of the teeth 116 so that the main-pole magnets 131a and 131b can be in contact with each other in the front-rear direction. The adjoining pairs of the main-pole magnets 131a and 131b are arranged side by side with a gap P2 left therebetween.

Each of the main-pole magnets 131a and 131b is formed into a substantially rectangular parallelepiped shape, the longitudinal direction of which extends in the left-right direction. The main-pole magnets 131a and 131b are magnetized in the directions indicated by arrows. In other words, the main-pole magnets 131a are permanent magnets, each of which has a lower N-pole and an upper S-pole. The main-pole magnets 131b are permanent magnets, each of which has an upper N-pole and a lower S-pole. The main-pole magnets 131a and 131b are not limited to the permanent magnets but may be, e.g., electromagnets.

In the mover 110 configured as above, the magnetic flux of the coils 113 of the armature 111 overlaps with the magnetic flux of the main-pole magnets 131a and 131b making up the main-pole magnet array 130, thereby generating progressive magnetic fields. The respective main-pole magnets 131a and 131b are arranged not only at the tip ends of the teeth 116 but also at the tip ends of openings of the slots 117 existing between the teeth 116. With this arrangement, it is possible to increase the density of the gap magnetic flux generated by the coils 113 and the main-pole magnets 131a and 131b and to increase the progressive magnetic fields.

Next, description will be made on the configuration of the stator 120. As shown in FIG. 2, the stator 120 is a salient pole member including a yoke portion 121 and a plurality of salient poles 122. The stator 120 is formed of a soft magnetic material such as laminated silicon steel plates, an SMC core, a 3%-Si iron or an iron-made structural member.

The yoke portion 121 is formed into a substantially rectangular parallelepiped shape, the longitudinal direction of which extends in the front-rear direction. The salient poles 122 are formed to protrude upward from the yoke portion 121. The longitudinal direction of the salient poles 122 extends in the left-right direction. The salient poles 122 are arranged at a specified interval in the front-rear direction.

The salient poles 122 of the stator 120 are provided to generate a thrust force between themselves and the magnetic fields generated by the mover 110. The mover 110 is moved in the front-rear direction with respect to the stator 120 by virtue of the thrust force. More specifically, the magnetic flux of the coils 113 of the armature 111 overlaps with the magnetic flux of the main-pole magnets 131a and 131b making up the main-pole magnet array 130, thereby generating e.g., thirteen-pole progressive magnetic fields. A thrust force is generated between the thirteen-pole progressive magnetic fields and the thirteen salient poles 122. In the example illustrated in FIG. 2, the mover 110 is moved in the front-rear direction with respect to the stator 120 by virtue of the thrust force.

In the linear motor 100 according to the first embodiment, for the sake of reducing the thrust force variation caused by cogging or the like, auxiliary-pole magnets 132a and 132b smaller in size than the main-pole magnets 131a and 131b are provided in the mover 110 in an opposing relationship with the auxiliary teeth 118a and 118b arranged at the stroke-direction opposite ends of the mover 110.

Figure 3:
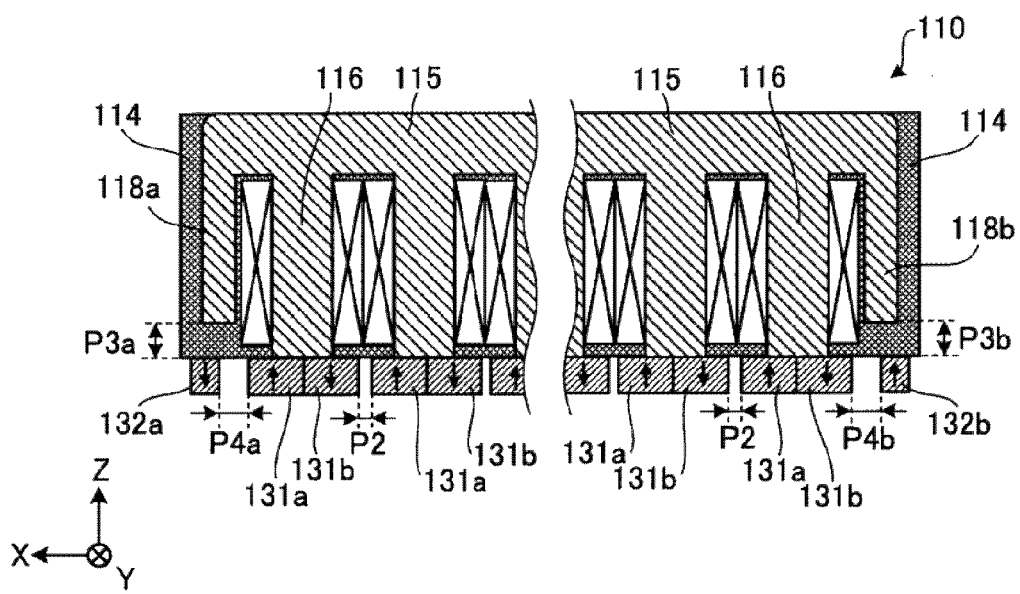
FIG. 3 is a schematic side section view showing a mover according to the first embodiment.

The auxiliary-pole magnets 132a and 132b will now be described in detail. FIG. 3 is a schematic side section view of the mover 110 according to the first embodiment. In FIG. 3, the stroke-direction central portion of the mover 110 is omitted.

The auxiliary-pole magnet 132a is a permanent magnet positioned at the front side of the main-pole magnet 131a existing at the front end of the main-pole magnet array 130 (see FIG. 2). The auxiliary-pole magnet 132a differs in polarity from the main-pole magnet 131a. In other words, the auxiliary-pole magnet 132a is a permanent magnet having an upper N-pole and a lower S-pole. The auxiliary-pole magnet 132a is formed into a substantially rectangular parallelepiped shape, the longitudinal direction of which extends in the left-right direction. The auxiliary-pole magnet 132a is shorter in stroke-direction length than the main-pole magnet 131a.

The armature 111 includes a molded resin 114 formed to have a flat shape flush with the tip end surfaces of the teeth 116. The auxiliary-pole magnet 132a is arranged on the molding resin 114 with a gap P3a left between itself and the auxiliary tooth 118a in the up-down direction. The molding resin 114 is formed to cover the front side of the auxiliary tooth 118a. Thus the front end of the auxiliary-pole magnet 132a can be positioned more frontward than the front end of the auxiliary tooth 118a.

The auxiliary-pole magnet 132a is arranged so that a gap P4a greater than the gap P2 can be left between the auxiliary-pole magnet 132a and the main-pole magnet array 130 (see FIG. 2) in the stroke direction. The stroke-direction length, the gap P3a and the gap P4a of the auxiliary-pole magnet 132a are set so as to reduce the deviation of a magnetic flux density in the front end portion of the mover 110. Accordingly, the thrust force variation can be reduced in the linear motor 100 according to the first embodiment.

Similarly, the auxiliary-pole magnet 132b is a permanent magnet positioned at the rear side of the main-pole magnet 131b existing at the rear end of the main-pole magnet array 130. The auxiliary-pole magnet 132b differs in polarity from the main-pole magnet 131b. In other words, the auxiliary-pole magnet 132b is a permanent magnet having a lower N-pole and an upper S-pole. The auxiliary-pole magnet 132b is formed into a substantially rectangular parallelepiped shape, the longitudinal direction of which extends in the left-right direction. The auxiliary-pole magnet 132b is shorter in stroke-direction length than the main-pole magnet 131b.

Just like the auxiliary-pole magnet 132a, the auxiliary-pole magnet 132b is arranged on the molding resin 114 with a gap P3b left between itself and the auxiliary tooth 118b in the up-down direction. The molding resin 114 is formed to cover the rear side of the auxiliary tooth 118b. Thus the rear end of the auxiliary-pole magnet 132b can be positioned more rearward than the rear end of the auxiliary tooth 118b.

The auxiliary-pole magnet 132b is arranged so that a gap P4b greater than the gap P2 can be left between the auxiliary-pole magnet 132b and the main-pole magnet array 130 in the stroke direction. The stroke-direction length, the gap P3b and the gap P4b of the auxiliary-pole magnet 132b are set so as to reduce the deviation of a magnetic flux density in the rear end portion of the mover 110. Accordingly, the thrust force variation can be reduced in the linear motor 100 according to the first embodiment.

The auxiliary-pole magnets 132a and 132b may be identical in shape with each other. The gaps P3a and P3b may be equal in dimension to each other. The gaps P4a and P4b may be equal in dimension to each other. In this case, the front and rear end portions of the mover 110 become symmetrical with each other. This makes it possible to reduce the thrust force variation when the mover 110 is move forward and backward.

Instead of the stroke-direction length of the auxiliary-pole magnets 132a and 132b, the left-right length of the auxiliary-pole magnets 132a and 132b may be set different than the left-right length of the main-pole magnets 131a and 131b. In addition to the stroke-direction length of the auxiliary-pole magnets 132a and 132b, the left-right length of the auxiliary-pole magnets 132a and 132b may be set different than the left-right length of the main-pole magnets 131a and 131b.

While the auxiliary-pole magnets 132a and 132b are provided in the vicinity of the opposite ends of the main-pole magnet array 130 in the linear motor 100 shown in FIG. 2, one of the auxiliary-pole magnets 132a and 132b may be provided at one end of the main-pole magnet array 130. Even in this case, it is equally possible to reduce the thrust force variation.

As described above, the linear motor 100 according to the first embodiment includes the auxiliary-pole magnets 132a and 132b, one or both of which is or are arranged in the vicinity of one end or opposite ends of the main-pole magnet array 130. It is therefore possible to reduce the thrust force variation and to accurately drive the linear motor 100.

While the number of the teeth 116 is nine and the number of the main-pole magnets 131a and 131b is eighteen in the linear motor 100 according to the first embodiment, the present disclosure is not limited thereto but may be modified in many different ways. Likewise, the size and shape of the salient poles 122 and the interval between the salient poles 122 are not limited to the ones illustrated in FIGS. 1 and 2 but may be modified in many different ways.

Second Embodiment

Figure 4:
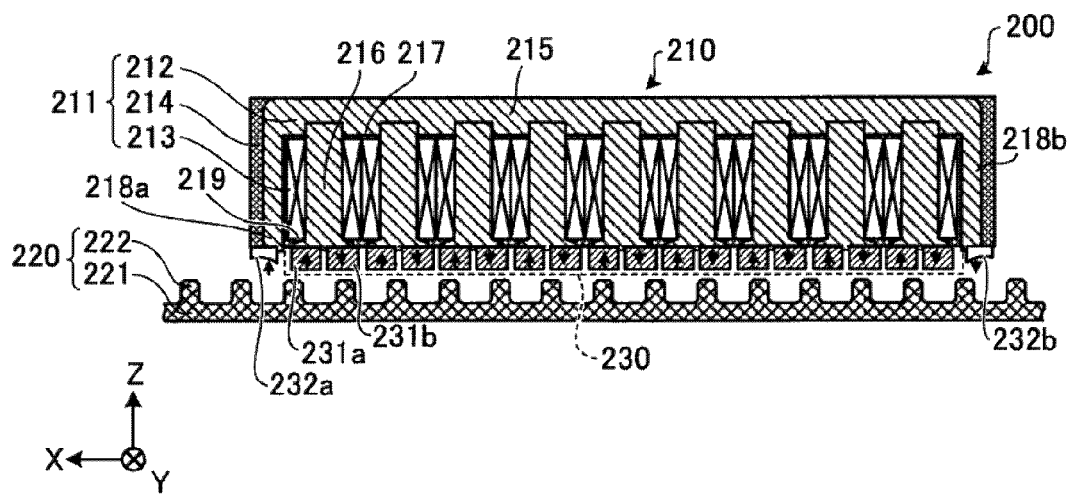
FIG. 4 is a schematic side section view showing a linear motor according to a second embodiment of the present invention.
Figure 5:
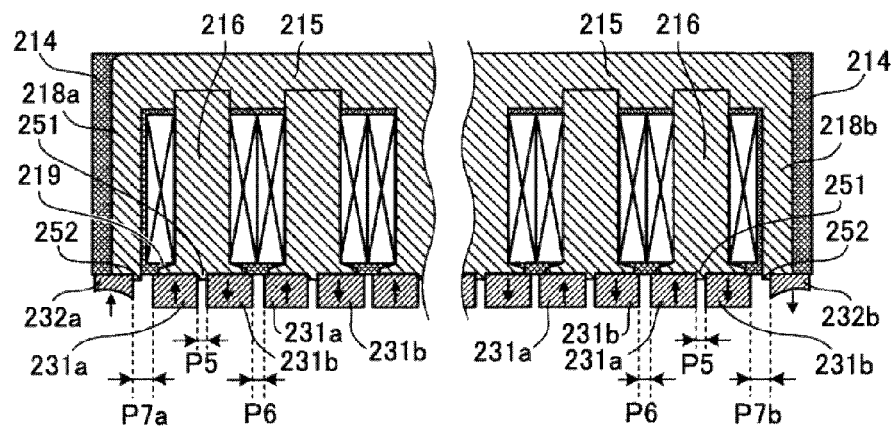
FIG. 5 is a schematic side section view showing a mover according to the second embodiment.

Description will now be made on the configuration of a linear motor according to a second embodiment of the present invention. FIG. 4 is a schematic side section view showing a linear motor according to a second embodiment. FIG. 5 is a schematic side section view showing a mover according to a second embodiment. In FIG. 5, the stroke-direction central portion of the mover is omitted. For the sake of convenience in description, the points differing from the linear motor 100 of the first embodiment will be primarily described with repetitive description omitted, if appropriate.

Referring to FIG. 4, the linear motor 200 according to the second embodiment includes an armature core 212 formed by inserting a plurality of teeth 216 into the recess portions of a yoke portion 215. Coils 213 are wound around the respective teeth 216 and are received within slots 217 defined between the teeth 216.

As shown in FIG. 5, a lug 251 serving as a protrusion for positioning each of the main-pole magnets 231a and 231b is formed on the tip end surface of each of the teeth 216. The longitudinal direction of the lug 251 extends in the left-right direction. Use of the lug 251 makes it possible to easily attach the main-pole magnets 231a and 231b to the teeth 216 and to enhance the attachment accuracy of the main-pole magnets 231a and 231b.

A flange portion 219 with a width increasing in the stroke direction is formed at the tip end of each of the teeth 216. The area of the flat tip end surface of each of the teeth 216 is increased due to the provision of the flange portion 219. This makes it possible to increase the attachment accuracy of a main-pole magnet array 230.

The accurate attachment of the main-pole magnets 231a and 231b makes it possible to enhance the accuracy of gaps P5 and P6. The gap P5 refers to a gap between the adjoining main-pole magnets 231a and 231b on the tip end surface of each of the teeth 216. The gap P6 refers to a gap between the adjoining pairs of the main-pole magnets 231a and 231b arranged on the tip end surfaces of the respective teeth 216.

In the linear motor 200 according to the second embodiment described above, it is possible to enhance the attachment accuracy of the main-pole magnet array 230 (see FIG. 4) in which the main-pole magnets 231a and 231b differing in polarity from each other are arranged alternately. Since the main-pole magnets 231a and 231b are arranged with the gap P5 left therebetween, it is possible to reduce the quantity of the main-pole magnets 231a and 231b.

Just like the linear motor 100, as shown in FIG. 4, the armature core 212 wound with the coils 213 are wholly molded with a molding resin 214. The tip end surfaces of the teeth 216 of the armature 211 are formed to have a flat shape. This makes it possible to strongly bond the main-pole magnet array 230 to the teeth 216 and to accurately arrange the main-pole magnet array 230.

As shown in FIG. 5, auxiliary teeth 218a and 218b substantially equal in up-down length to the teeth 216 are arranged in the vicinity of the outermost teeth 216. The auxiliary teeth 218a and 218b are formed into one piece with the yoke portion 215.

Auxiliary-pole magnets 232a and 232b are fixed to the tip ends of the auxiliary teeth 218a and 218b. The auxiliary-pole magnet 232a is a permanent magnet positioned at the front side of the main-pole magnet 231a existing at the front end of the main-pole magnet array 230 (see FIG. 4). The auxiliary-pole magnet 232a has the same polarity as the main-pole magnet 231a. Likewise, the auxiliary-pole magnet 232b is a permanent magnet positioned at the rear side of the main-pole magnet 231b existing at the rear end of the main-pole magnet array 230. The auxiliary-pole magnet 232b has the same polarity as the main-pole magnet 231b.

A lug 252 serving as a protrusion for positioning each of the auxiliary-pole magnets 232a and 232b is formed on the tip end surface of each of the auxiliary teeth 218a and 218b. The longitudinal direction of the lug 252 extends in the left-right direction. Use of the lug 252 makes it possible to easily attach the auxiliary-pole magnets 232a and 232b and to enhance the attachment accuracy of the auxiliary-pole magnets 232a and 232b.

The accurate attachment of the auxiliary-pole magnets 232a and 232b makes it possible to the accuracy of gaps P7a and P7b. The gaps P7a and P7b denote the distances between the opposite ends of the main-pole magnet array 230 and the auxiliary-pole magnets 232a and 232b.

The longitudinal direction of the auxiliary-pole magnets 232a and 232b extends in the left-right direction. The auxiliary-pole magnets 232a and 232b have a substantially trapezoidal shape when seen in a cross-sectional view along the front-rear direction. The up-down thickness of the auxiliary-pole magnets 232a and 232b becomes smaller toward the front-rear ends of the mover 210. A lower surface of each of the auxiliary-pole magnets 232a and 232b is formed into an arc-like shape in the front-rear direction.

Accordingly, as compared with a case where the auxiliary-pole magnets 232a and 232b have a square shape when seen in a cross-sectional view along the front-rear direction, it is possible to increase the degree of freedom in adjusting the magnetic flux density at the opposite end portions of the mover 210 and, hence, to easily reduce the thrust force variation. The shape of the auxiliary-pole magnets 232a and 232b is not limited the one set forth above but may be differently changed to other shapes, e.g., a triangular shape when seen in a cross-sectional view.

While the auxiliary-pole magnets 232a and 232b are provided adjacent to the opposite ends of the main-pole magnet array 230 in the example shown in FIG. 4, one of the auxiliary-pole magnets 232a and 232b may be provided at one end of the main-pole magnet array 230. In case where the auxiliary-pole magnet 232a or 232b is provided at only one end of the main-pole magnet array 230 in this manner, it is possible to reduce the thrust force variation.

As shown in FIG. 4, a stator 220 is arranged in a spaced-apart relationship with the mover 210. The stator 220 includes a yoke portion 221 and a plurality of salient poles 222 arranged on the upper surface of the yoke portion 221. Each of the salient poles 222 extends in the left-right direction and has a tip end formed into an arc-like shape when seen in a cross-sectional view.

In the linear motor 200 of the second embodiment described above, one or both of the auxiliary-pole magnets 232a and 232b is or are arranged adjacent to one end or opposite ends of the main-pole magnet array 230. It is therefore possible to reduce the thrust force variation and, hence, to accurately drive the linear motor 200.

Since the positioning lugs 251 and 252 are formed in the linear motor 200, it is possible to accurately attach the main-pole magnets 231a and 231b and the auxiliary-pole magnets 232a and 232b and to reliably reduce the thrust force variation.

While the number of the teeth 216 is nine and the number of the main-pole magnets 231a and 231b is eighteen in the linear motor 200 according to the second embodiment, the present disclosure is not limited thereto but may be modified in many different ways. Likewise, the size and shape of the salient poles 222 and the interval between the salient poles 222 are not limited to the ones illustrated in FIG. 4 but may be modified in many different ways.

While the lugs 252 are formed on the tip end surfaces of the auxiliary teeth 218a and 218b, the present disclosure is not limited thereto. For example, the tip end surfaces of the auxiliary teeth 218a and 218b may be formed into flat surfaces and the auxiliary-pole magnets 232a and 232b may be arranged in contact with the flat surfaces.

Third Embodiment

Figure 6:
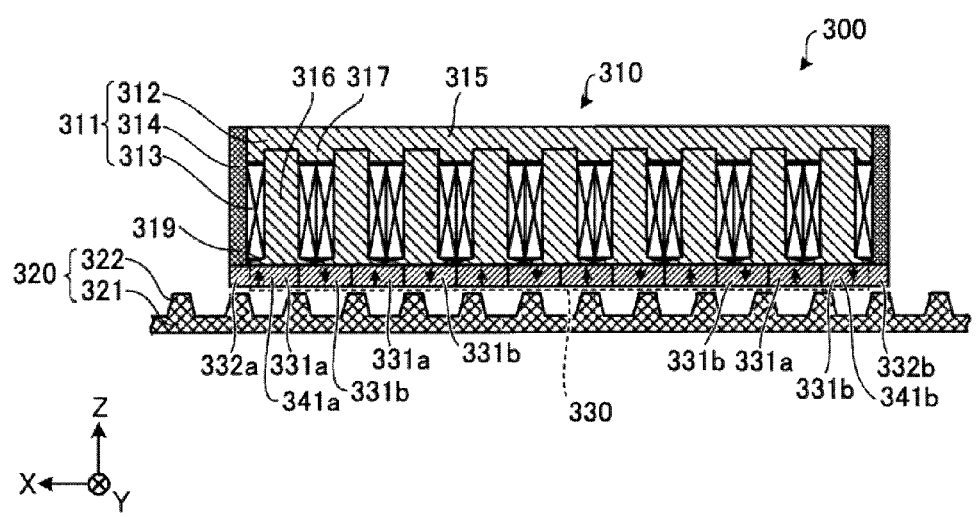
FIG. 6 is a schematic side section view showing a linear motor according to a third embodiment of the present invention.

Description will now be made on the configuration of a linear motor according to a third embodiment. FIG. 6 is a schematic side section view showing a linear motor according to the third embodiment. For the sake of convenience in description, the points differing from the linear motor 100 of the first embodiment will be primarily described with repetitive description omitted, if appropriate.

Referring to FIG. 6, the linear motor 300 according to the third embodiment includes an armature core 312 formed by inserting a plurality of teeth 316 into the recess portions of a yoke portion 315. Coils 313 are wound around the respective teeth 316 and are received within slots 317 defined between the teeth 316.

Unlike the armature 111 of the first embodiment, the armature 311 is not provided with auxiliary teeth. A flange portion 319 with a width increasing in the stroke direction is formed at the tip end of each of the teeth 316. The flange portions 319 of the adjoining teeth 316 make contact with each other. As a result, the end surface of the armature 311 at the side of the teeth 316 can be made flat. Alternatively, the flange portions 319 of the teeth 316 may be joined into one piece. Even in this case, the end surface of the armature 311 at the side of the teeth 316 can be made flat.

Since the end surface of the armature 311 at the side of the teeth 316 is made flat in this manner, it is possible to strongly bond the main-pole magnet array 330 to the teeth 316 of the armature 311 and to accurately arrange the main-pole magnet array 330. In addition, the main-pole magnets 331a and 331b of the main-pole magnet array 330 are arranged with no gap left therebetween. This also makes it possible to accurately arrange the main-pole magnet array 330.

In the mover 310 of the third embodiment, as described above, auxiliary teeth are not formed and the auxiliary-pole magnets 332a and 332b for reducing the thrust force ripple are formed into one piece with the main-pole magnets 331a and 331b. Therefore, as compared with a case where the auxiliary-pole magnets 332a and 332b are arranged in a spaced-apart relationship with the main-pole magnets 331a and 331b, it is possible to shorten the front-rear length of the mover 310 and to reduce the size of the mover 310.

More specifically, as shown in FIG. 6, permanent magnets 341a and 341b are formed at the stroke-direction opposite ends of the main-pole magnet array 330 by uniting the auxiliary-pole magnet 332a with the main-pole magnet 331a and uniting the auxiliary-pole magnet 332b with the main-pole magnet 331b. The permanent magnets 341a and 341b serve as main-pole magnets for generating a thrust force and as auxiliary-pole magnets for reducing a thrust force ripple.

The main-pole magnet 331a and the auxiliary-pole magnet 332a are magnetized in the same direction to have a lower N-pole and an upper S-pole. Likewise, the main-pole magnet 331b and the auxiliary-pole magnet 332b are magnetized in the same direction to have an upper N-pole and a lower S-pole. The stroke-direction length of the permanent magnets 341a and 341b is equal to the sum of the stroke-direction length of the main-pole magnets 331a and 331b and the stroke-direction length of the auxiliary-pole magnets 332a and 332b.

The portion of the permanent magnet 341a corresponding to the auxiliary-pole magnet 332a protrudes forward beyond the flange portion 319 of the corresponding tooth 316. Likewise, the portion of the permanent magnet 341b corresponding to the auxiliary-pole magnet 332b protrudes backward beyond the flange portion 319 of the corresponding tooth 316. The protruding portions of permanent magnets 341a and 341b are supported by a molding resin 314.

While each of the main-pole magnets 331a and 331b and each of the auxiliary-pole magnets 332a and 332b are formed into one piece in the example shown in FIG. 6, the present disclosure is not limited thereto. As an alternative example, the main-pole magnet 331a and the auxiliary-pole magnet 332a may be formed to make contact with each other with no gap left therebetween. Similarly, the main-pole magnet 331b and the auxiliary-pole magnet 332b may be formed to make contact with each other with no gap left therebetween.

While the permanent magnets 341a and 341b formed by uniting the main-pole magnet 331a and 331b and the auxiliary-pole magnet 332a and 332b together are provided at the stroke-direction opposite ends of the mover 310 in the example shown in FIG. 6, the present disclosure is not limited thereto. As an alternative example, a permanent magnet serving as an auxiliary-pole magnet may be arranged at only one stroke-direction end of the mover 310. More specifically, the permanent magnet 341a may be arranged at the front end of the mover 310, and the main-pole magnet 331b in place of the permanent magnet 341b may be arranged at the rear end of the mover 310. Alternatively, the main-pole magnet 331a in place of the permanent magnet 341a may be arranged at the front end of the mover 310, and the permanent magnet 341b may be arranged at the rear end of the mover 310.

As shown in FIG. 6, a stator 320 is arranged in a spaced-apart relationship with the mover 310. The stator 320 includes a yoke portion 321 and a plurality of salient poles 322 arranged on the upper surface of the yoke portion 321. Each of the salient poles 322 extends in the left-right direction and has a tip end formed into a trapezoidal shape when seen in a cross-sectional view.

In the linear motor 300 of the third embodiment described above, the auxiliary-pole magnets 332a and 332b for reducing the thrust force ripple are formed into one piece with the main-pole magnets 331a and 331b. Therefore, as compared with a case where the auxiliary-pole magnets 332a and 332b are arranged in a spaced-apart relationship with the main-pole magnets 331a and 331b, it is possible to shorten the front-rear length of the mover 310 and to reduce the size of the mover 310. Moreover, auxiliary teeth are not formed in the armature core 312 of the linear motor 300. This also makes it possible to reduce the size of the mover 310.

While the number of the teeth 316 is nine and the number of the main-pole magnets 331a and 331b is twelve in the linear motor 300 according to the third embodiment, the present disclosure is not limited thereto but may be modified in many different ways. Likewise, the size and shape of the salient poles 322 and the interval between the salient poles 322 are not limited to the ones illustrated in FIG. 6 but may be modified in many different ways.

Other features and modified examples may be conceived by those skilled in the art. While the preferred embodiments of the present disclosure have been described above, the present disclosure is not limited to these specific embodiments but may be modified or changed in many different forms without departing from the scope of the invention defined in the claims or the equivalent to the subject matters of the claims.

For example, the configurations of the linear motors 100, 200 and 300 according to the first through third embodiments may be combined arbitrarily. While the auxiliary-pole magnets 132a, 132b, 232a and 232b are magnetized in the up-down direction in the first and second embodiments, they may be magnetized either in the oblique direction or in the stroke direction.

While the auxiliary teeth 118a, 118b, 218a and 218b are arranged at the front and rear ends of the movers 110 and 210 in the first and second embodiments, the present disclosure is not limited thereto. In other words, the auxiliary tooth 118a or 118b may be arranged at one of the front and rear ends of the mover 110. Likewise, the auxiliary tooth 218a or 218b may be arranged at one of the front and rear ends of the mover 210.

What is claimed is:

1. A mover for a linear motor, comprising:
an armature having a plurality of teeth arranged along a line and wound with coils;
a main-pole magnet array arranged at a side of the armature at which the teeth exist, the main-pole magnet array including a plurality of main-pole magnets with different polarities alternately arranged along an arranging direction of the teeth; and
auxiliary-pole magnets each of which is arranged adjacent to one of two opposite ends of the main-pole magnet array,
wherein each of the auxiliary-pole magnets is arranged in a spaced-apart relationship with a main-pole magnet positioned closest thereto,
wherein the main-pole magnets and the auxiliary-pole magnets are permanent magnets,
wherein each pair of the main-pole magnets is arranged at a tip end surface of each of the teeth,
wherein adjoining pairs of the main-pole magnets are arranged with a first gap therebetween,
wherein each of the auxiliary-pole magnets and the main-pole magnet positioned closest thereto are arranged with a second gap therebetween, and
wherein the second gap is greater than the first gap.

2. The mover of claim 1, wherein each of the auxiliary-pole magnets is smaller in size than each of the main-pole magnets.

3. The mover of claim 1, wherein the armature includes auxiliary teeth each of which is arranged adjacent to one end of the arranging direction of the teeth and not wound with a coil, each of the auxiliary-pole magnets being arranged in an opposing relationship with one of the auxiliary teeth.

4. The mover of claim 3, wherein each of the auxiliary-pole magnets is arranged in a spaced-apart relationship with said one of the auxiliary teeth.

5. The mover of claim 3, wherein each of the auxiliary-pole magnets is arranged in direct contact with said one of the auxiliary teeth.

6. The mover of claim 5, wherein each of the auxiliary teeth includes a tip end surface and a lug formed on the tip end surface to position each of the auxiliary-pole magnets.

7. The mover of claim 1, wherein each of the teeth includes a tip end surface and a lug formed on the tip end surface to position one of the main-pole magnets.

8. The mover of claim 1, wherein a gap between each of the auxiliary-pole magnets and the main-pole magnet positioned closest thereto is greater than a gap between any two neighboring main-pole magnets.

9. The mover of claim 1, wherein a length in a stroke-direction of each of the auxiliary-pole magnets is shorter than that of each of the main-pole magnets.

10. The mover of claim 1, wherein
the auxiliary-pole magnets are each arranged adjacent to one of two opposite ends of the mover.

11. The mover of claim 10, wherein
the mover only includes two of the auxiliary-pole magnets.

12. A linear motor, comprising:
a stator having a plurality of salient poles arranged in a specified interval; and
a mover arranged in an opposing relationship with the stator, the mover including: an armature having a plurality of teeth arranged along a line and wound with coils; a main-pole magnet array arranged at a side of the armature at which the teeth exist, the main-pole magnet array including a plurality of main-pole magnets with different polarities alternately arranged along an arranging direction of the teeth; and auxiliary-pole magnets each of which is arranged adjacent to one of two opposite ends of the main-pole magnet array,
wherein each of the auxiliary-pole magnets is arranged in a spaced-apart relationship with a main-pole magnet positioned closest thereto,
wherein the main-pole magnets and the auxiliary-pole magnets are permanent magnets,
wherein each pair of the main-pole magnets is arranged at a tip end surface of each of the teeth,
wherein adjoining pairs of the main-pole magnets are arranged with a first gap therebetween,
wherein each of the auxiliary-pole magnets and the main-pole magnet positioned closest thereto are arranged with a second gap therebetween, and
wherein the second gap is greater than the first gap.

13. The linear motor of claim 12, wherein a gap between each of the auxiliary-pole magnets and the main-pole magnet positioned closest thereto is greater than a gap between any two neighboring main-pole magnets.

14. The linear motor of claim 12, wherein a length in a stroke-direction of each of the auxiliary-pole magnets is shorter than that of each of the main-pole magnets.

15. The linear motor of claim 12, wherein
the auxiliary-pole magnets are each arranged adjacent to one of two opposite ends of the mover.

16. The linear motor of claim 15, wherein
the mover only includes two of the auxiliary-pole magnets.

* * * * *